United States Patent [19]

Kallenberger et al.

[11] Patent Number: 5,676,471
[45] Date of Patent: Oct. 14, 1997

[54] DRAGLINE WITH IMPROVED THRUST BEARING ASSEMBLY SUPPORTING UPPER STRUCTURE

[75] Inventors: Harvey J. Kallenberger, Wind Lake; Joseph L. Huffman, Mukwonago, both of Wis.

[73] Assignee: Harnischfeger Corporation, St. Francis, Wis.

[21] Appl. No.: 537,300

[22] Filed: Sep. 29, 1995

[51] Int. Cl.⁶ .................................................. B62D 53/08
[52] U.S. Cl. ..................... 384/593; 384/618; 384/619; 384/622
[58] Field of Search ..................... 384/618, 619, 384/620, 621, 622, 568, 571, 450, 593, 565, 564

[56] References Cited

U.S. PATENT DOCUMENTS

| | | | |
|---|---|---|---|
| 313,022 | 2/1885 | Powers | 384/568 |
| 631,394 | 8/1899 | Bradshaw | 384/593 |
| 656,332 | 8/1900 | Townsend | 384/591 |
| 978,392 | 12/1910 | Newton | 384/591 |
| 1,044,342 | 11/1912 | Buckley | 384/618 |
| 1,489,345 | 4/1924 | Close | 384/565 |
| 2,040,741 | 5/1936 | Hoke | 384/571 |
| 2,350,079 | 5/1944 | Spalding | 384/622 X |
| 4,582,436 | 4/1986 | Merron | 384/621 X |
| 4,622,860 | 11/1986 | Cametti et al. | 384/621 X |
| 4,723,852 | 2/1988 | Ehret | 384/620 X |
| 5,154,012 | 10/1992 | Kallenberger | 37/116 |
| 5,205,657 | 4/1993 | Feld | 384/621 |

FOREIGN PATENT DOCUMENTS

| | | | |
|---|---|---|---|
| 49407 | 10/1918 | Sweden | 384/593 |
| 109656 | 2/1944 | Sweden | 384/593 |

*Primary Examiner*—Daniel P. Stodola
*Assistant Examiner*—William A. Rivera
*Attorney, Agent, or Firm*—Michael, Best & Friedrich

[57] ABSTRACT

Apparatus comprising a lower support structure having an upper surface, a circular lower rail which is mounted on the upper surface of the lower support structure and which is centered on a generally vertical axis, an upper structure having a lower surface, a circular upper rail which is mounted on the lower surface of the upper structure and which is centered on the axis, a plurality of rollers which are located between the upper and lower rails and which support the upper structure for rotation relative to the lower structure about the axis, the rollers being rotatable about respective generally horizontal axes intersecting the vertical axis at a common point, one of the rails including an inwardly facing surface defining a portion of a sphere centered on the point, and each of the rollers including an outwardly facing surface which engages the inwardly facing surface and which defines a portion of a sphere centered on the point.

20 Claims, 4 Drawing Sheets

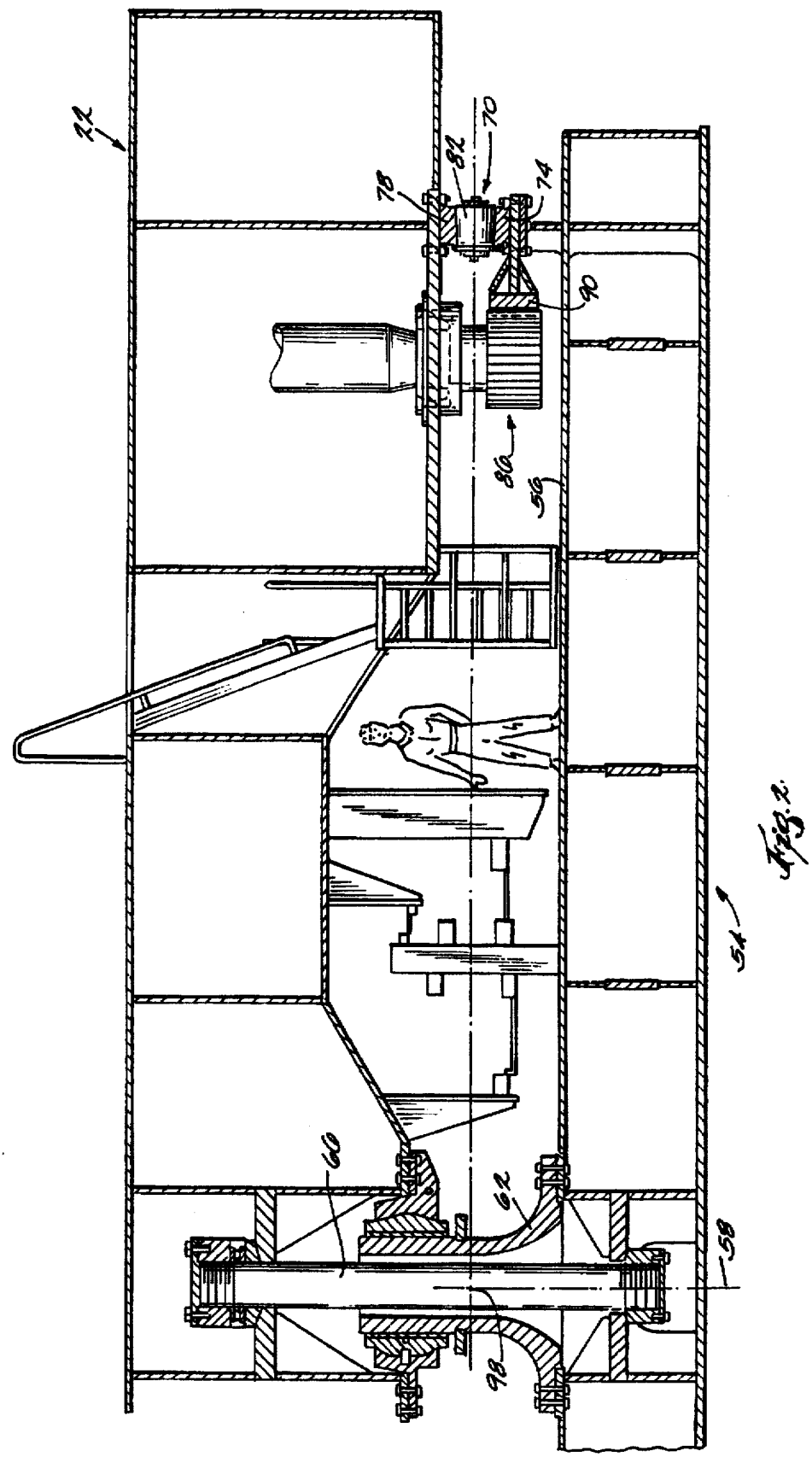

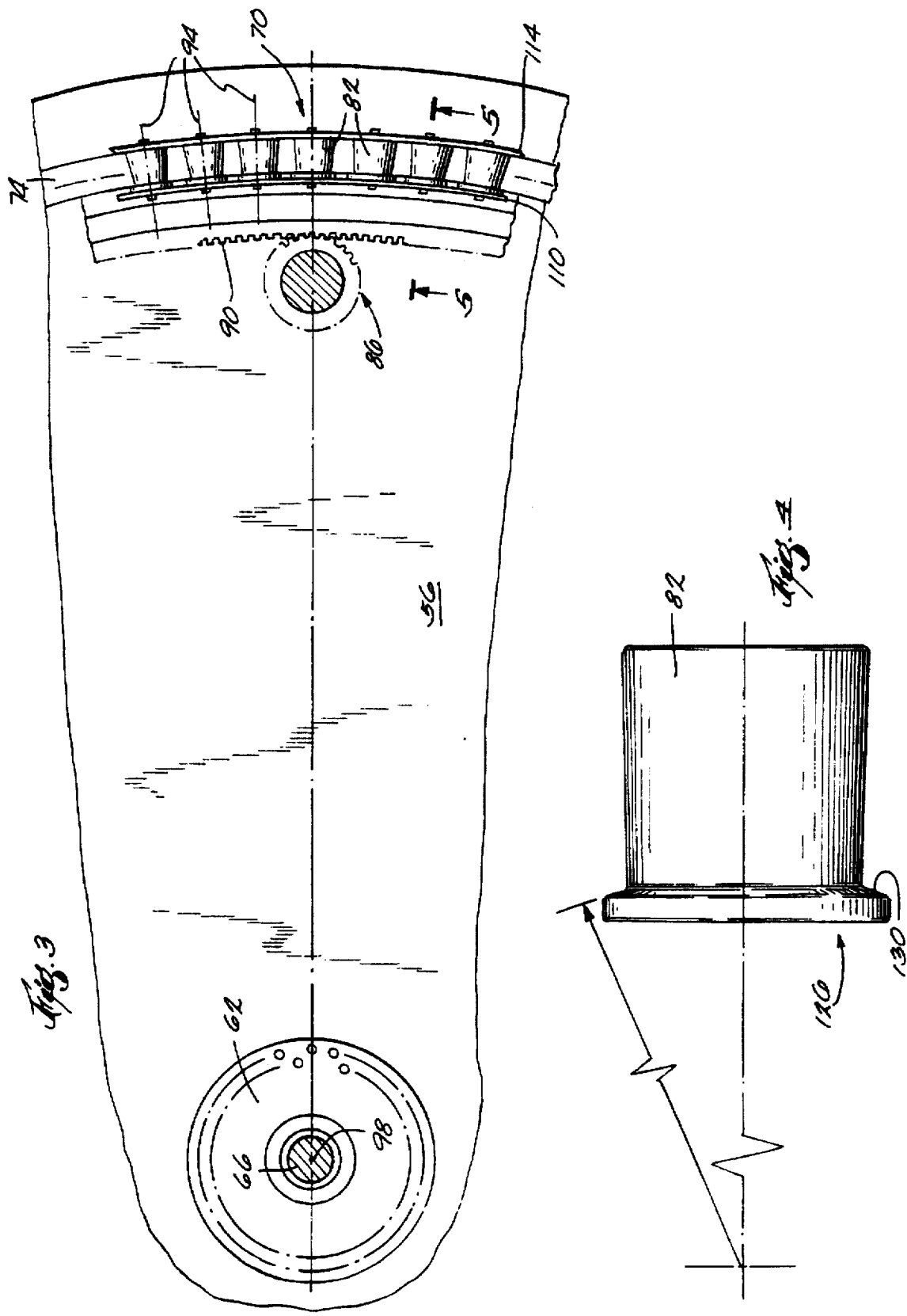

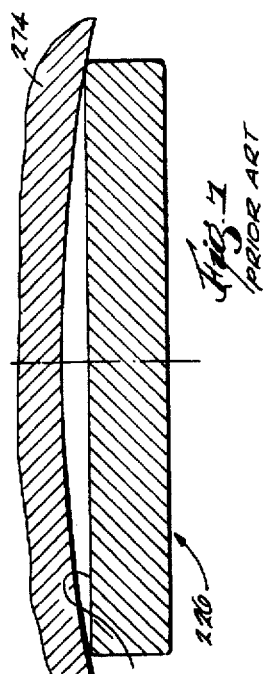
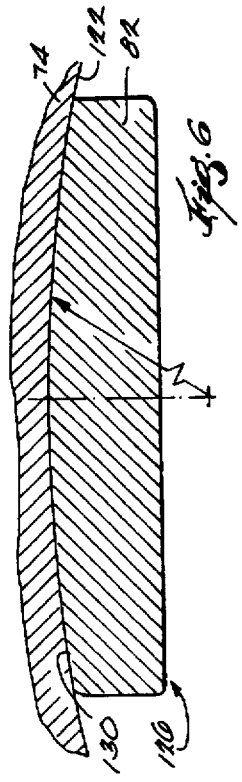
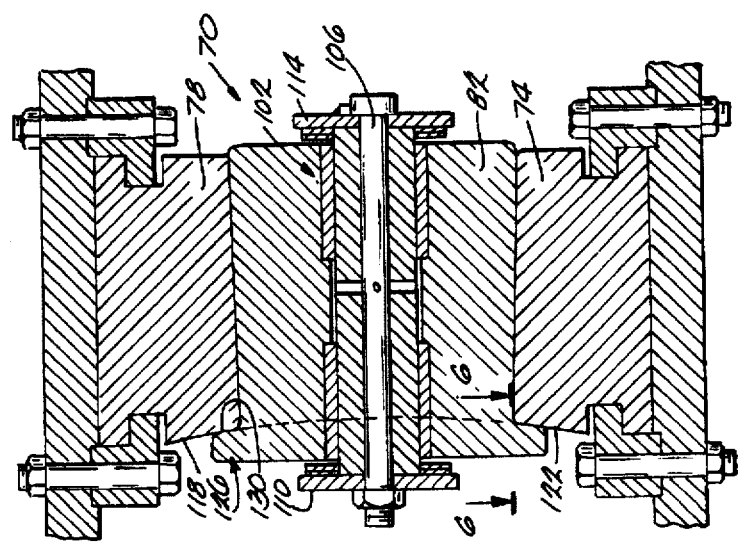
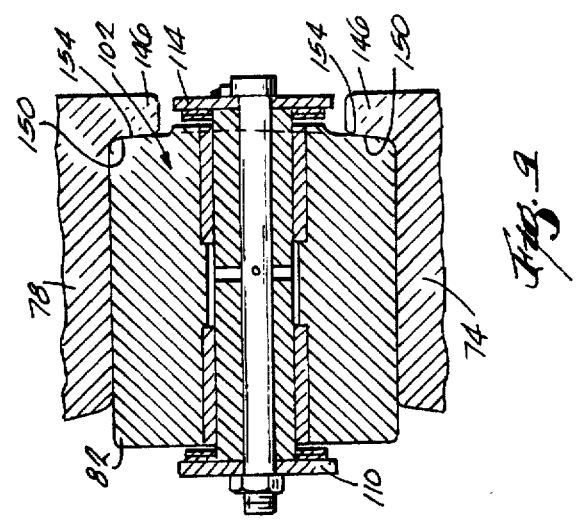
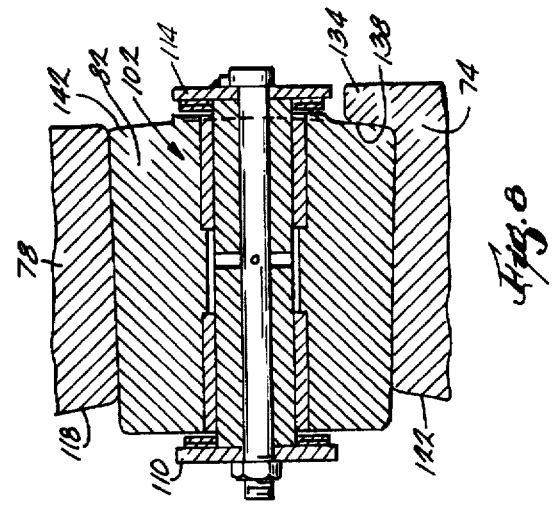

DRAGLINE WITH IMPROVED THRUST BEARING ASSEMBLY SUPPORTING UPPER STRUCTURE

BACKGROUND OF THE INVENTION

1. Field of the Invention

The invention relates to large machines having relatively rotatable upper and lower structures. More particularly, the invention relates to draglines.

2. Discussion of Prior Art

A walking dragline typically includes an upper structure and a boom which extends upwardly and outwardly from the upper structure and which has thereon a sheave for supporting a hoist rope. The hoist rope extends over the sheave to a bucket for causing vertical movement of the bucket. A drag rope is connected to the bucket for causing horizontal movement of the bucket. The upper structure is supported by a tub that sits on the ground when the dragline is engaged in digging operations. The upper structure is supported above the tub, for rotation about a vertical axis, by a large thrust bearing that includes a circular lower rail on the tub, a circular upper rail on the upper structure, and a plurality of rollers between the rails. A pair of walking mechanisms are mounted on the opposite sides of the upper structure and are operable for moving the dragline over the ground between digging operations.

Large machines, such as draglines, with revolving upper frames utilizing tapered and straight rollers have historically had, on the rollers, straight or planar thrust flanges that bear against the inner faces of the circular rails on which they roll. This provides only two points of contact between each roller and each rail, resulting in very high local contact pressures and a concentrated bending load on the roller flanges. This is illustrated in FIG. 7, which is discussed below. These high loads typically deform and/or wear out the roller flanges quickly and can eventually lead to failure of the parts.

SUMMARY OF THE INVENTION

The invention contours the roller flange and the inside rail face, or a rail lip and the outer end of the roller, to provide full contact between the roller and the rail. This distributes the radial force over the full area in which the roller and rail overlap. Contact pressures and bending stresses are thus reduced, resulting in much higher reliability and longer life of the roller and rail.

More particularly, in one embodiment of the invention, one or both of the rails include an inwardly facing surface defining a portion of a sphere centered on the point at which the horizontal axes of the rollers intersect the pivot axis of the upper structure. Each of the rollers includes a flange having an outwardly facing surface which engages the inwardly facing rail surface(s) and which defines a portion of a sphere centered on the same point. Because the engaging surfaces are so formed, there is contact between the entire overlapping portions of the surfaces.

In another embodiment of the invention, one or both of the rails have lips with inwardly facing surfaces defining a portion of a sphere centered on the same point, and the outer end of each roller has an outwardly facing surface which engages the inwardly facing rail surface(s) and which defines a portion of a sphere centered on that point. The result is the same.

Maximizing the contact area between the roller and the rail better distributes the contact loads and thus lowers the wear rate and increases the life of the components. This also distributes the radial force on the roller flange or rail lip over a larger area to increase the radial load capacity of the bearing. Additionally, spreading the load on each side of the roller axis stabilizes the roller to reduce skewing of the roller on the rail. This increases true rolling motion and reduces spalling of the contact surfaces.

Other features and advantages of the invention will become apparent to those skilled in the art upon review of the following detailed description, claims and drawings.

DESCRIPTION OF THE DRAWINGS

FIG. 2 is a partial vertical cross-sectional view of the dragline.

FIG. 3 is a view taken generally along line 3—3 in FIG. 2 with parts omitted for clarity.

FIG. 4 is an enlarged view of one of the rollers.

FIG. 5 is an enlarged view taken along line 5—5 in FIG. 3.

FIG. 6 is a view taken along line 6—6 in FIG. 5.

FIG. 7 is a view similar to FIG. 6 of a prior art construction with a straight roller flange.

FIG. 8 is a view similar to FIG. 5 showing an alternative embodiment of the invention.

FIG. 9 is a view similar to FIG. 5 showing another alternative embodiment of the invention.

Figure 1:
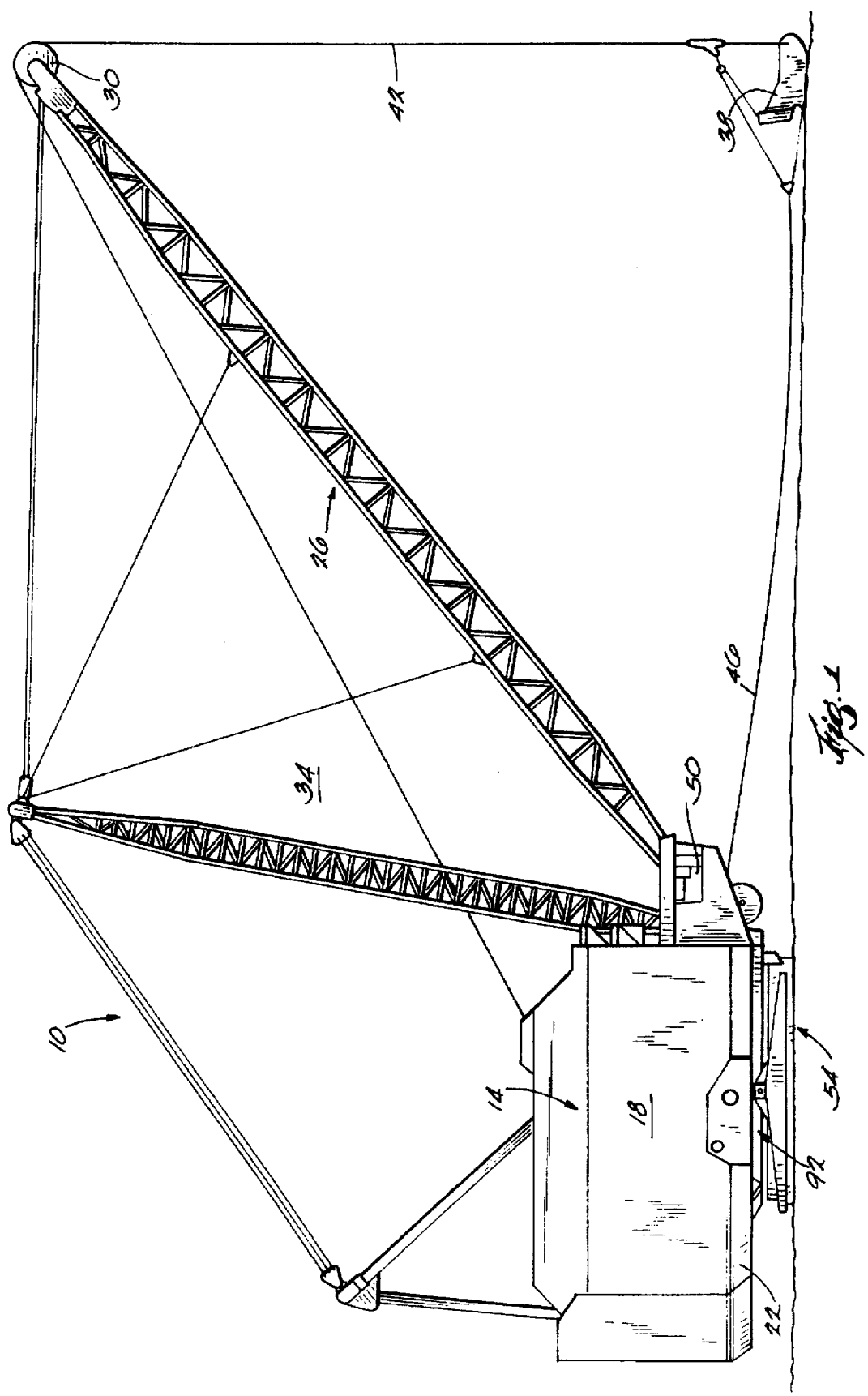
FIG. 1 is a side elevational view of a dragline embodying the invention.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

A dragline 10 embodying the invention is illustrated in the drawings. The dragline 10 comprises (FIG. 1) an upper structure 14 including a main housing 18 mounted on top of a deck 22. The dragline 10 also includes, inside the main housing 18, a bucket hoist mechanism (not shown) and a bucket drag mechanism (not shown). A boom 26 extends upwardly and outwardly from the upper structure 14. The upper end of the boom 26 has thereon a sheave 30. The boom 26 is supported relative to the upper structure 14 by conventional supporting structure 34. The dragline 10 also includes a bucket 38, a hoist rope 42 extending between the bucket hoist mechanism and the bucket 38 and over the sheave 30 for causing vertical movement of the bucket 38, and a drag rope 46 extending between the bucket drag mechanism and the bucket 38 for causing horizontal movement of the bucket 38. An operator's cab 50 is mounted on the upper structure 14.

The dragline 10 further includes a lower structure or tub 54 which sits on the ground and supports the upper structure 14 during digging operations. The tub 54 has an upper surface 56 (see FIG. 2). The upper structure 14 is rotatable relative to the tub 54 about a vertical axis 58 (see FIG. 2). More particularly, the upper structure 14 rotates about a center pintle 62 (see FIG. 2) which is mounted on the lower structure 54 and which is centered on the pivot axis 58. A lifting pin 66 extends along the axis 58 and connects the upper structure 14 to the lower structure 54. A bearing assembly 70 supports the upper structure 14 above the lower structure 54. The bearing assembly 70 includes (see FIGS. 2 and 3) a circular lower rail 74 on the lower structure 54, a circular upper rail 78 on the upper structure 14, and a plurality of substantially identical rollers 82 between the rails 74 and 78. The bearing assembly 70 is described in greater detail below. The upper structure 14 is rotated relative to the lower structure 54 by a gear drive 86 which is mounted on the upper structure 14 and which engages a circular ring gear 90 mounted on the lower structure 54. The dragline 10 also comprises (see FIG. 1) a pair of walking mechanisms 92 (only one is shown) which move the dragline 10 over the ground between digging operations.

As shown in FIG. 3, the rollers 82 rotate about respective axes 94, all of which intersect the pivot axis 58 at a common point 98 (see FIGS. 2 and 3). More particularly, as shown in FIG. 5, each roller 82 rotates with an axial bearing 102 relative to a pin assembly 106 supported by inner and outer rings 110 and 114, respectively. The rings 110 and 114 facilitate spacing of adjacent rollers 82 and axial orientation of the rollers 82. In the illustrated construction, the rollers 82 are tapered, but it should be understood that the invention is also applicable to straight rollers 82.

As shown in FIG. 5, the upper rail 78 includes an inwardly facing surface 118, and the lower rail 74 includes an inwardly facing surface 122. The surfaces 118 and 122 define a portion of a sphere centered on the point 98. The curvature of the surfaces 118 and 122 is exaggerated in FIGS. 5 and 6 for clarity. Due to the distance between the point 98 and the surfaces 118 and 122 on an actual dragline, the curvature of the actual surfaces 118 and 122 is almost imperceptible to the naked eye. Each roller 82 includes, on the inner end of the roller 82, a flange 126 (see FIGS. 4 and 5) having an outwardly facing surface 130 engaging the rail surfaces 118 and 122. The surface 130 defines a portion of a sphere centered on the point 98, so that the entire overlapping portions of the surfaces 118 and 130 and 122 and 130 are in contact. This is illustrated in FIG. 6. In contrast, in a typical prior art construction, as shown in FIG. 7, the rail 274 has a cylindrical surface 222, and the roller flange 226 has a planar surface 230 making contact with the surface 222 at only two points.

An alternative embodiment of the invention is illustrated in FIG. 8. In this embodiment, the lower rail 74 includes a lip 134 having an inwardly facing surface 138 that defines a portion of a sphere centered on the point 98. Also, the outer end of each roller 82 includes an outwardly facing surface 142 engaging the rail surface 138. The surface 142 defines a portion of a sphere centered on the point 98, so that the entire overlapping portions of the surfaces 138 and 142 are in contact.

Another alternative embodiment of the invention is illustrated in FIG. 9. In this embodiment, each of the rails 74 and 78 includes a lip 146 having an inwardly facing surface 150 that defines a portion of a sphere centered on the point 98. Also, the outer end of each roller 82 includes an outwardly facing surface 154 engaging the rail surfaces 150. The surface 154 defines a portion of a sphere centered on the point 98, so that the entire overlapping portions of the surfaces 150 and 154 are in contact. In this embodiment the rollers 82 are straight rather than tapered, although the rollers 82 could be tapered.

Various features of the invention are set forth in the following claims.

We claim:

1. Apparatus comprising
   a lower support structure having an upper surface,
   a circular lower rail which is mounted on said upper surface of said lower support structure and which is centered on a generally vertical axis,
   an upper structure having a lower surface,
   a circular upper rail which is mounted on said lower surface of said upper structure and which is centered on said axis,
   a plurality of rollers which are located between said upper and lower rails and which support said upper structure for rotation relative to said lower structure about said axis, said rollers being rotatable about respective generally horizontal axes intersecting said vertical axis at a common point,
   one of said rails including an inwardly facing surface defining a portion of a sphere centered on said point, and
   each of said rollers including an outwardly facing surface which engages said inwardly facing surface and which defines a portion of a sphere centered on said point.

2. Apparatus as set forth in claim 1 wherein each of said rollers includes a flange having thereon said outwardly facing surface.

3. Apparatus as set forth in claim 1 wherein each of said rails has thereon an inwardly facing surface which engages said outwardly facing surface and which defines a portion of a sphere centered on said point.

4. Apparatus as set forth in claim 1 wherein said lower rail has thereon said inwardly facing surface.

5. Apparatus as set forth in claim 4 wherein said lower rail includes a lip having thereon said inwardly facing surface.

6. Apparatus as set forth in claim 4 wherein said upper rail also has thereon an inwardly facing surface which defines a portion of a sphere centered on said point and which engages said outwardly facing surface.

7. Apparatus as set forth in claim 1 wherein said upper rail has thereon said inwardly facing surface.

8. Apparatus as set forth in claim 7 wherein said upper rail includes a lip having thereon said inwardly facing surface.

9. Apparatus as set forth in claim 1 wherein said rollers are tapered.

10. An apparatus as set forth in claim 1 wherein said outwardly facing surface and said inwardly facing surface have overlapping portions, and wherein substantially the entire overlapping portions of said outwardly facing surface and said inwardly facing surface are in contact.

11. A dragline comprising
    an upper structure having a lower surface,
    a lower support structure having an upper surface,
    a circular lower rail which is mounted on said upper surface of said lower support structure and which is centered on a generally vertical axis,
    a circular upper rail which is mounted on said lower surface of said upper structure and which is centered on said axis,
    a plurality of rollers which are located between said upper and lower rails and which support said upper structure for rotation relative to said lower structure about said axis, said rollers being rotatable about respective generally horizontal axes intersecting said vertical axis at a common point,
    one of said rails including an inwardly facing surface defining a portion of a sphere centered on said point, each of said rollers including an outwardly facing surface which engages said inwardly facing surface and which defines a portion of a sphere centered on said point, a boom extending from said upper structure, said boom having thereon a sheave, a bucket, a hoist rope extending over said sheave to said bucket for causing vertical movement of said bucket, and a drag rope connected to said bucket for causing horizontal movement of said bucket.

12. A dragline as set forth in claim 11 wherein each of said rollers includes a flange having thereon said outwardly facing surface.

13. A dragline as set forth in claim 11 wherein each of said rails has thereon an inwardly facing surface which engages said outwardly facing surface and which defines a portion of a sphere centered on said point.

14. A dragline as set forth in claim 11 wherein said lower rail has thereon said inwardly facing surface.

15. A dragline as set forth in claim 14 wherein said lower rail includes a lip having thereon said inwardly facing surface.

16. A dragline as set forth in claim 14 wherein said upper rail also has thereon an inwardly facing surface which defines a portion of a sphere centered on said point and which engages said outwardly facing surface.

17. A dragline as set forth in claim 11 wherein said upper rail has thereon said inwardly facing surface.

18. A dragline as set forth in claim 17 wherein said upper rail includes a lip having thereon said inwardly facing surface.

19. A dragline as set forth in claim 11 wherein said rollers are tapered.

20. A dragline comprising an upper structure having a lower surface, a lower support structure having an upper surface, a circular lower rail which is mounted on said upper surface of said lower support structure and which is Centered on a generally vertical axis, a circular upper rail which is mounted on said lower surface of said upper structure and which is centered on said axis, a plurality of rollers which are located between said upper and lower rails and which support said upper structure for rotation relative to said lower structure about said axis, said rollers being rotatable about respective generally horizontal axes intersecting said vertical axis at a common point, one of said rails including an inwardly facing surface defining a portion of a sphere centered on said point, each of said rollers including an outwardly facing surface which engages said inwardly facing surface and which defines a portion of a sphere centered on said point, said outwardly facing surface and said inwardly facing surface having overlapping portions, and substantially the entire overlapping portions of said outwardly facing surface and said inwardly facing surface being in contact, a boom extending from said upper structure, said boom having thereon a sheave, a bucket, a hoist rope extending over said sheave to said bucket for causing vertical movement of said bucket, and a drag rope connected to said bucket for causing horizontal movement of said bucket.

* * * * *